Nov. 20, 1956     A. W. SEYFRIED     2,771,111
AGITATOR AND CUTTER UNIT FOR DISINTEGRATING FOOD MIXERS
Filed Sept. 30, 1955     4 Sheets-Sheet 1

INVENTOR.
ARTHUR W. SEYFRIED
BY
Bertha L. MacGregor
ATTORNEY

Nov. 20, 1956 A. W. SEYFRIED 2,771,111
AGITATOR AND CUTTER UNIT FOR DISINTEGRATING FOOD MIXERS
Filed Sept. 30, 1955 4 Sheets-Sheet 2
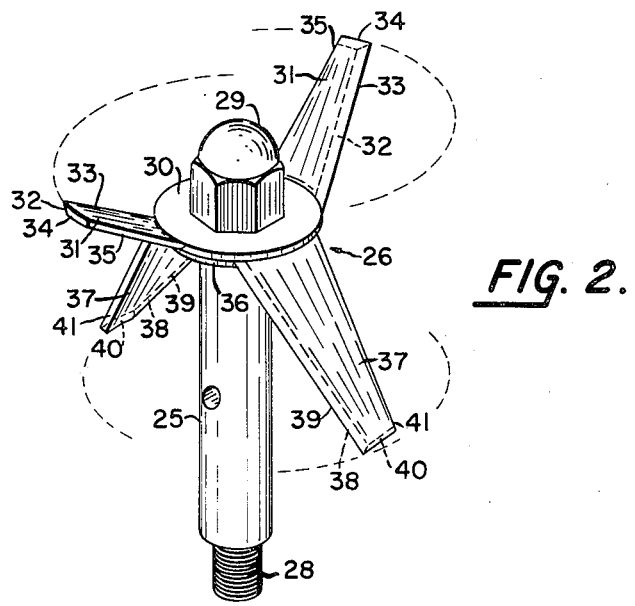
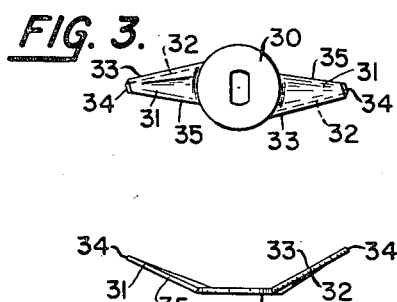
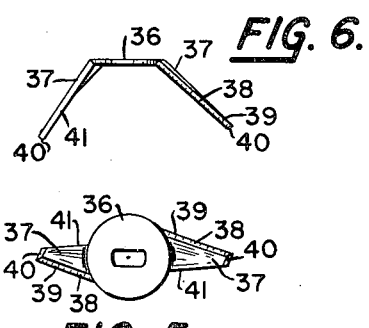
INVENTOR.
ARTHUR W. SEYFRIED
BY
Bertha L. MacGregor
ATTORNEY INVENTOR.
ARTHUR W. SEYFRIED
BY Bertha L. MacGregor
ATTORNEY Nov. 20, 1956   A. W. SEYFRIED   2,771,111
AGITATOR AND CUTTER UNIT FOR DISINTEGRATING FOOD MIXERS
Filed Sept. 30, 1955   4 Sheets-Sheet 4
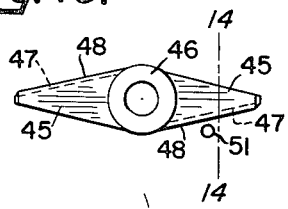
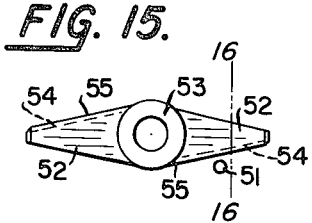
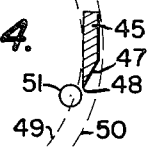
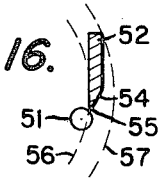
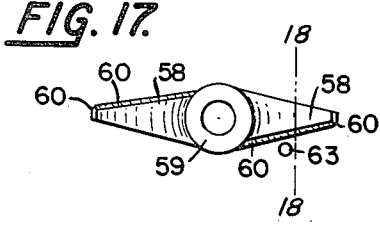
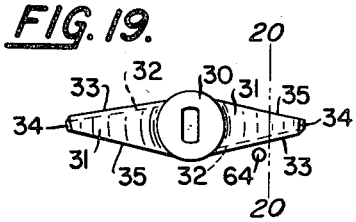
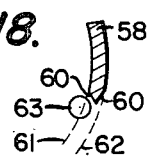
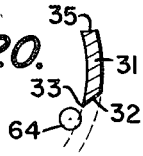
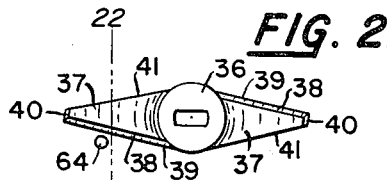
INVENTOR.
ARTHUR W. SEYFRIED
BY Bertha L. MacGregor
ATTORNEY

United States Patent Office 2,771,111
Patented Nov. 20, 1956

2,771,111

AGITATOR AND CUTTER UNIT FOR DISINTEGRATING FOOD MIXERS

Arthur W. Seyfried, Racine, Wis., assignor to Scovill Manufacturing Company, Waterbury, Conn., a specially chartered corporation of Connecticut Application September 30, 1955, Serial No. 537,803

11 Claims. (Cl. 146—68)

This application is a continuation-in-part of my copending application Serial No. 327,985, filed December 26, 1952, allowed July 21, 1955. The invention relates to an agitator and cutter assembly for disintegrating food mixers, adapted for rotation in the food container of such mixers.

The main object of the invention is to provide an efficient agitator and cutter which quickly cuts food into very small particles without producing excessive turbulence in the container contents and depositing partly cut particles of food on the walls of the container.

Another object of the invention is to produce a low cost agitator and cutter which functions efficiently for its intended purposes. The major cost factor in producing cutter blades is the grinding of the cutting edge. I have produced an efficient cutter which, in its preferred form, is provided with a single cutting edge on each blade, ground on one side only, whereby a minimum of metal is removed at a minimum of expense.

Another object of the invention is to provide cutter blades which rotate in different paths, the projected width of said paths or tracks being equal to but not greater than the thickness of the blades. The blades conform to the surface of a frusto-conical section whose axis is coincident with the axis of rotation of said blades. By constructing the blades as hereinafter described, each blade travels in an annular path confined to the thickness of the blade, whereby food particles passing downwardly in the container come into contact with the cutting edges of the non-tracking blades, without over-flow of the container contents and without depositing food particles on the walls of the container. The advantages resulting from this construction will be apparent from the following specification.

In the drawings:

Fig. 2 is a perspective view, enlarged, of the agitator and cutter unit, detached from the mixer, the dotted lines indicating the paths in which the blades travel.

Fig. 3 is a top plan view of the upper pair of blades of the agitator and cutter of Fig. 2.

Fig. 4 is a side elevational view of the blades shown in Fig. 3.

Fig. 5 is a bottom plan view of the lower pair of blades of the agitator and cutter unit of Fig. 2.

Fig. 6 is a side elevational view of the blades shown in Fig. 5.

Fig. 13 is a plan view of a pair of cutter blades having flat upper and lower surfaces, and Fig. 14 is a transverse section taken in the plane of the dotted line 14—14 of Fig. 13, indicating the projected width of the paths in which said blades travel.

Fig. 15 is a plan view of a pair of cutter blades having flat upper and lower surfaces, but pitched transversely, and Fig. 16 is a transverse section taken in the plane of the dotted line 16—16 of Fig. 15, indicating the projected width of the paths in which said blades travel.

Fig. 17 is a plan view of a pair of cutter blades embodying a modification of my invention, and Fig. 18 is a transverse sectional view taken in the plane of the dotted line 18—18 of Fig. 17 indicating the projected width of the paths in which said blades travel.

Fig. 19 is a plan view of the upper pair of cutter blades embodying my invention in its preferred form, and Fig. 20 is a transverse sectional view in the plane of the dotted line 20—20 of Fig. 19, indicating the projected width of the paths in which said blades travel.

Fig. 21 is a bottom plan view of the lower pair of cutter blades embodying my invention in its preferred form, and Fig. 22 is a transverse sectional view in the plane of the dotted line 22—22 of Fig. 21, indicating the projected width of the paths in which said blades travel.

Figure 1:
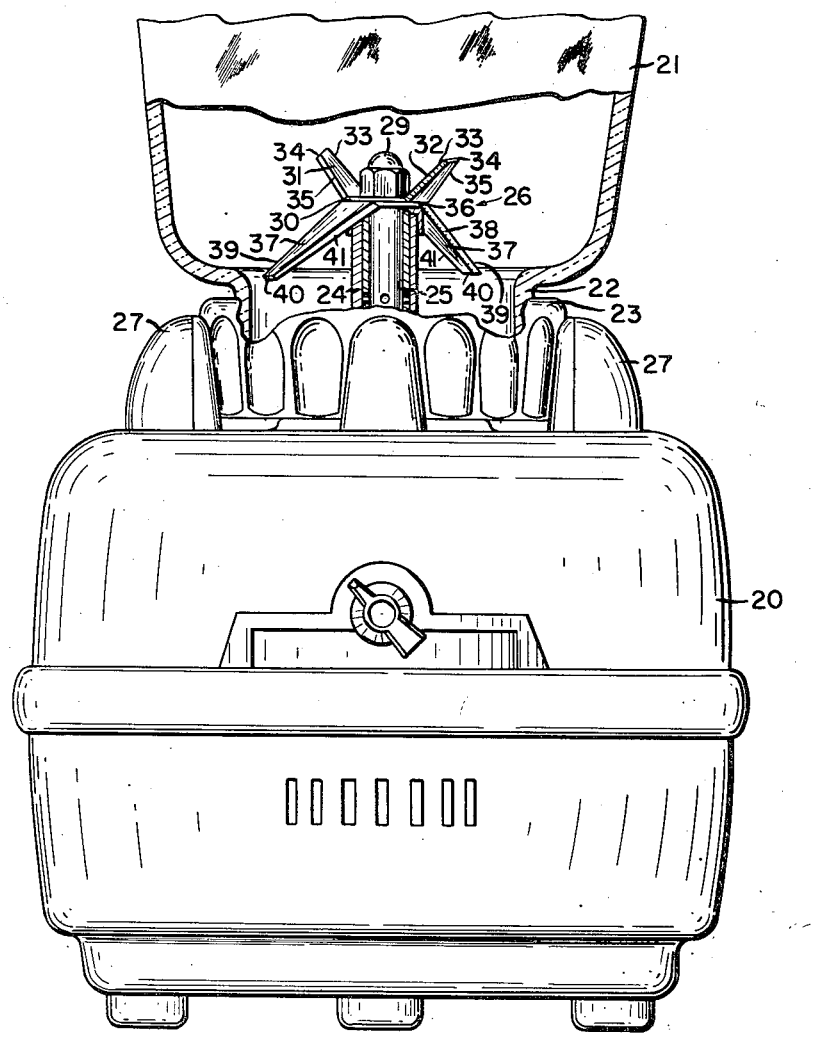
Fig. 1 is an elevational view, partly in section, of a disintegrating food mixer provided with an agitator and cutter assembly embodying my invention, rotatably mounted in the food container.
Figure 7:
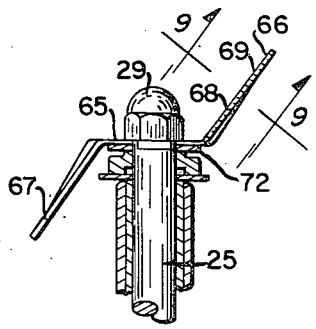
Fig. 7 is an elevational view, partly in section, of a modified form of agitator and cutter unit, detached from the mixer, showing the operating shaft partly broken away.
Figure 8:
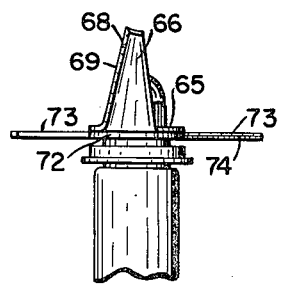
Fig. 8 is a side elevational view of the modified unit shown in Fig. 7.
Figure 10:
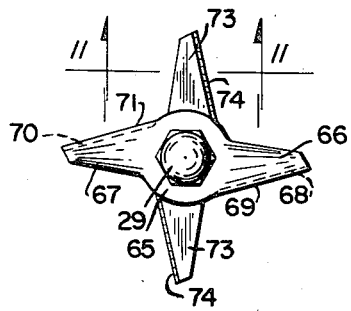
Fig. 10 is a plan view of the unit shown in Fig. 7.
Figure 9:
Fig. 9 is a transverse sectional view of one of the conical blades, taken in the plane of the line 9—9 of Fig. 7.
Figure 11:
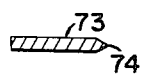
Fig. 11 is a transverse sectional view of one of the knife-edge flat horizontal blades of the modified unit, taken in the plane of the line 11—11 of Fig. 10.

In Fig. 1 is shown a disintegrating food mixer of the type known as "liquidizers," comprising a housing 20 which constitutes the base of the machine and encloses a motor having a shaft which is separably coupled to the shaft of the agitator and cutter unit of this invention. A food container 21 (partly broken away) has a screw threaded neck 22 on its lower open end, closed by a threaded closure cap member 23 provided with a centrally located shaft bearing 24 in which is rotatably mounted the shaft 25 of the agitator and cutter indicated as a whole at 26. When the closure cap member 23 has been secured in place on the screw threaded neck 22 of the food container 21, the closed container is positioned on top of the housing 20 between upright rests 27 fixed to said housing.

In the preferred embodiment of my invention shown in Figs. 1 to 6, and 19 to 22, inclusive, the agitator and cutter unit 26 comprises the shaft 25, preferably provided on its lower end with screw threads 28 (Fig. 2) for connecting thereto a drive coupling (not shown), and on its upper end with a hex nut 29 engaging the upper reduced screw threaded end of the shaft 25 and retaining two pairs of cutter blade members on a shoulder formed by milled flat surfaces (not shown) on opposite sides of said shaft.

The upper cutter blade member comprises a round flat disc 30 provided with a centrally located elongated slot which engages the milled flat surfaces and shoulder on the upper end of the shaft 25. Said blade member has integrally formed, oppositely positioned cutter blades 31, 31, extending radially upwardly from said disc 30. The blades 31 are upturned at different angles, one of said blades preferably extending upwardly at 25 degrees and the other at 35 degrees to the disc 30, so as to be non-tracking. The blades are curved transversely throughout their length and each forms part of a hollow inverted frusto-cone; that is, the upper surfaces of the blades 31 are concave and the lower surfaces are convex.

The lead or cutting edge of each of the blades 31 is beveled on its under side, that is, on the convex or outer surface of the cone, as indicated at 32, thus forming a sharp cutting edge 33 on the longitudinal edge of the blade 31 where the beveled surface 32 forms an acute angle with the surface which constitutes the inner side of the hollow inverted cone described by the blade's revolutions. The blades 31 are widest arcuately adjacent the central disc 30 and gradually become narrower toward their outer ends 34 which are cut on a line at right angles to the cutting edge 33, thereby making said cutting edges 33 slightly longer than the non-cutting edges 35.

The lower cutter blade member comprises a round flat disc 36 provided with a centrally located elongated slot and having integrally formed oppositely positioned cutter blades 37, 37, extending radially downwardly from the disc 36. The blades 37 are downturned at different angles, one of said blades preferably extending downwardly at 47 degrees and the other at 55 degrees to the plane of the disc 36, so as to be non-tracking. Like the upper blades, said blades 37 are curved transversely throughout their length, and each forms part of a hollow frusto-cone; the outer blade surfaces being convex and the inner surfaces being concave.

The lead or cutting edge of each of the two blades 37 is beveled on its lower surface, that is on the inner concave surface of the cone, as indicated at 38, thus forming a sharp cutting edge 39 on the longitudinal edge of the blade 37 where the beveled surface 38 forms an acute angle with the surface which constitutes the outer convex side of the cone described by the blade's revolutions. The blades 37 are widest arcuately adjacent the central disc 36 and gradually become narrower toward their outer ends 40 which are cut on a line at right angles to the cutting edge 39, thereby making said cutting edges 39 slightly longer than the non-cutting edges 41.

The two cutter members are fixed on the upper end of the shaft 25 in such position that the blades are equally spaced apart circumferentially, each blade 31 being circumferentially midway between blades 37.

I have shown the upper cutter disc 30 with two upwardly inclined blades 31, and the lower cutter disc 36 with downwardly inclined blades 37, but obviously each of the discs could carry one upwardly and one downwardly inclined blade 31 and 37, arranged circumferentially as described.

In Figs. 13 to 22, inclusive, are shown plan and transverse sectional views of different blades for the purpose of illustrating the depth of the paths these blades define as they pass through the container contents. It will be understood that the depth of the path defined by a flat blade disposed in a plane at right angles to the axis of the shaft is always equal to the blade thickness, but such a cutter is not efficient because the cutting edges of the blades do not traverse the container contents in cutting relationship thereto. I have discovered that when the blade is made to extend upwardly or downwardly from said plane to attain cutting efficiency, the depth of its path of travel becomes greater than its own thickness unless the blade is curved annularly.

Fig. 13 shows a cutter having flat blades 45 extending upwardly from the flat horizontally disposed central disc 46, the leading edges of the blades being beveled as indicated at 47 to provide cutting edges 48. When this cutter is rotated, the blades 45 project a path having a depth almost twice the thickness of the blade as indicated by the distance between the dotted lines 49—50 of Fig. 14. This depth of the paths projected by the traveling blades 45 results in excessive turbulence and resistance, and a tendency on the part of the food particles 51 to contact the blade surfaces and to move out of the path of the approaching cutting edges 48.

Fig. 15 shows a cutter which has flat blades 52 extending upwardly from the horizontally disposed central disc 53, the leading edges of the blades being beveled as indicated at 54 to provide a cutting edge 55. It differs from the cutter of Figs. 13 and 14 in that the blades 52 are pitched to bring the edge 55 into better cutting position within the path of rotation of the blades 52, but the turbulence created by this cutter is excessive due to the depth of the projected path of travel indicated by the dotted lines 56—57 of Fig. 16, which is approximately double the actual thickness of the blades 52.

Figs. 17 and 18 show a cutter embodying a modification of my invention. The blades 58 extend from the central flat disc 59, upwardly for the upper cutter member, or downwardly for the lower cutter member, as heretofore explained in connection with the assembled cutter shown in Figs. 1 and 2. The cutter blades 58 of Fig. 17 also are curved annularly, thus forming part of a hollow cone, but they differ from the preferred forms shown in Figs. 1 to 6 and 19 to 22, inclusive, in that the cutting edge is formed by grinding on both sides of the blade as indicated at 60 in Fig. 18. The projected depth of the path of travel of the blades 58 is equal to the thickness of the blade, as indicated by the dotted lines 61—62 of Fig. 18, and therefore the turbulence of the container contents is minimized as compared to the non-curved blades of Figs. 7 to 10, inclusive. However, the knife sharpened edge 60 is not as efficient in attaining cutting contact with the food particles 63 as are the chisel shaped cutting edges 33 (Fig. 20) and 39 (Fig. 22) of the preferred forms of my invention.

The chisel sharpened cutting edges 33 and 39 make most efficient cutting contact with the food particles designated 64 and, due to the annular curvature of said blades, the depth of their paths of travel is equal only to the thickness of the blades whereby turbulence of the container contents and deposit of partly cut food particles on the walls of the container are greatly reduced as compared to the operation of other forms of blades.

Referring now to the modified cutter unit shown in Figs. 7 to 12, inclusive, mounted non-rotatably on the rotatable shaft 25 and retained by the hex nut 29 previously described, said unit comprises a round flat disc 65 provided with a centrally located elongated slot (such as described in connection with the discs 30 and 36) and having integrally formed oppositely positioned cutter blades 66, 67, one extending radially upwardly and one extending radially downwardly from the disc 65. The blades extend at approximately 54 degree angles to the disc 65. The blades are curved transversely throughout their length and each conforms to the surface of a frusto-conical section whose axis is coincident with the axis of rotation of said blades. The upper surface of the blade 66 is concave and its lower surface is convex, while the upper surface of the blade 67 is convex and its lower surface is concave.

The lead or cutting edge of the blade 66 is beveled on its under side, that is, on the convex or outer surface of the cone as indicated at 68, thus forming a sharp cutting edge 69 on the longitudinal edge of the blade 66 where the beveled surface 68 forms an acute angle with the surface which constitutes the inner side of the hollow inverted cone described by the blade's revolutions.

The lead or cutting edge of the blade 67 is beveled on its lower surface, that is on the inner concave surface of the cone, as indicated at 70, thus forming a sharp cutting edge 71 on the longitudinal edge of the blade 67 where the beveled surface 70 forms an acute angle with the surface which constitutes the outer convex side of the cone described by the blade's revolutions.

The shape of the blades 66, 67, is the same as heretofore described with respect to the blades 31 and 37, respectively.

Figure 12:
Fig. 12 is a view similar to Fig. 11, showing a chisel edge modification of the horizontal blade.

The cutter disc 65 rests on a similar disc 72 having integrally formed oppositely extending flat cutter blades 73, 73. The blades 73 are horizontally disposed, with flat parallel upper and lower surfaces. The leading edges of the blades 73 may be knife sharpened as indicated at 74 in Fig. 11, or chisel sharpened as indicated in Fig. 12, where the bevel surface 75 is formed on the under side of the blade to provide a sharp cutting edge 76 on the upper surface of the blade. I prefer to use the chisel sharpened cutting edge shown in Fig. 12 on the horizontal blades 73 because it requires a grinding operation on only one surface, instead of two grinding operations for the knife sharpened edge 74.

I have found that an agitator cutter unit such as shown in Figs. 7-12, inclusive, is very efficient and, under certain tests, performs the cutting operation in less time than the agitator cutter unit shown in Figs. 1-6, inclusive. A cutter unit employing only the blades 66, 67, without horizontally disposed blades 73, is also efficient in its cutting action and with respect to the time required for the operation. However, the cutter unit shown in Figs. 1-6, inclusive, employing two upwardly inclined and two downwardly inclined blades such as described, produces less vibration caused by dynamic unbalance than does the modified unit shown in Figs. 7-12, inclusive, employing one upwardly inclined blade, one downwardly inclined blade, and two horizontally disposed blades such as described.

Each of the cutter units described embodies two or more of the curved blades which conform to the surface of a frusto-conical section whose axis is coincident with the axis of rotation of said blades, whereby the projected width of the paths or tracks in which they travel is equal to but not greater than the thickness of the blades. As previously stated, this feature of construction minimizes turbulence in the container contents.

In describing the invention, reference has been made to particular examples embodying the same, but I wish it to be understood that the invention is not limited to the structures shown in the drawings and that various changes may be made in the construction and general arrangement of parts without departing from the invention.

I claim:

1. An agitator and cutter unit for disintegrating food mixers comprising a rotatable shaft and a cutter member comprising a radially upwardly inclined blade having an annularly concave upper surface and a convex lower surface, and a radially downwardly inclined blade having an annularly convex upper surface and a concave lower surface, said blades being mounted on the shaft to rotate therewith and conforming to the surface of a frusto-conical section whose axis is coincident with the axis of rotation of said blades.

2. The agitator and cutter unit defined by claim 1, in which the upwardly inclined bldae is beveled on its lower convex surface adjacent its leading edge, said beveled surface intersecting the upper concave surface of the blade and forming a sharp straight cutting edge, and in which the downwardly inclined blade is beveled on its lower concave surface adjacent its leading edge, said beveled surface intersecting the upper convex surface of the blade and forming a sharp straight cutting edge.

3. An agitator and cutter uint for disintegrating food mixers comprising a rotatable shaft and a cutter member comprising a radially upwardly inclined blade having an annularly concave upper surface and a convex lower surface, a radially downwardly inclined blade opposite said upwardly inclined blade having an annularly convex upper surface and a concave lower surface, and a pair of oppositely positioned flat radially extending horizontally disposed blades located circumferentially midway between the inclined blades, said blades being mounted on the shaft to rotate therewith and said inclined blades conforming to the surface of a frusto-conical section whose axis is coincident with the axis of rotation of said inclined blades.

4. The agitator and cutter unit defined by claim 3, in which the upwardly inclined blade is beveled on its lower convex surface adjacent its leading edge, said beveled surface intersecting the upper concave surface of the blade and forming a sharp straight cutting edge, and in which the downwardly inclined blade is beveled on its lower concave surface adjacent its leading edge, said beveled surface intersecting the upper convex surface of the blade and forming a sharp straight cutting edge.

5. The agitator and cutter unit defined by claim 3, in which the upwardly inclined blade is beveled on its lower convex surface adjacent its leading edge, said beveled surface intersecting the upper concave surface of the blade and forming a sharp straight cutting edge, in which the downwardly inclined blade is beveled on its lower concave surface adjacent its leading edge, said beveled surface intersecting the upper convex surface of the blade and forming a sharp straight cutting edge, and in which the horizontally disposed blades are beveled on their lower flat surfaces adjacent their leading edges, said beveled surfaces intersecting the upper flat surfaces of the horizontal blades and forming sharp straight cutting edges.

6. An agitator and cutter unit for disintegrating food mixers comprising a rotatable shaft, an upper cutter member comprising a pair of oppositely radially upwardly inclined blades having annularly concave upper surfaces and convex lower surfaces, a lower cutter member comprising a pair of oppositely radially downwardly inclined blades having annularly convex upper surfaces and concave lower surfaces, said blades being mounted on the shaft to rotate therewith and conforming to the surface of a frusto-conical section whose axis is coincident with the axis of rotation of said blades.

7. An agitator and cutter unit for disintegrating food mixers comprising a rotatable shaft, an upper cutter member comprising a pair of oppositely radially upwardly inclined blades having annularly concave upper surfaces and convex lower surfaces, each of said lower convex surfaces being beveled on one longitudinal edge and intersecting the upper concave surface in a sharp cutting edge, a lower cutter member comprising a pair of oppositely radially downwardly inclined blades having annularly convex upper surfaces and concave lower surfaces, each of said lower concave surfaces being beveled on one longitudinal edge and intersecting the upper convex surface in a sharp cutting edge, said blades conforming to the surface of a frusto-conical section whose axis is coincident with the axis of rotation of said blades, and means fixedly mounting said cutter members on the shaft to rotate therewith.

8. An agitator and cutter unit for disintegrating food mixers comprising a rotatable shaft, an upper cutter member comprising a pair of oppositely radially upwardly inclined blades having annularly concave upper surfaces and convex lower surfaces, each of said lower convex surfaces being beveled on one longitudinal edge and intersecting the upper concave surface in a sharp cutting edge, a lower cutter member comprising a pair of oppositely radially downwardly inclined blades having annularly convex upper surfaces and concave lower surfaces, each of said lower concave surfaces being beveled on one longitudinal edge and intersecting the upper convex surface in a sharp cutting edge, each of said blades being gradually annularly narrowed between the shaft and outer end of the blade, and the free end of each blade being cut off at right angles to its longitudinal cutting edge, said blades conforming to the surface of a frusto-conical section whose axis is coincident with the axis of rotation of said blades, and means fixedly mounting said cutter members on the shaft to rotate therewith.

9. An agitator and cutter unit for disintegrating food mixers comprising a vertical rotatable shaft, an upper cutter blade member which comprises a central flat portion and integrally formed oppositely positioned cutter blades extending radially upwardly from the central portion at different angles, the upper surfaces of said upper blades being concave and the lower surfaces convex, each blade being beveled on its lower convex surface adjacent its leading edge, said beveled surface intersecting the upper concave surface of the blade and forming a sharp straight cutting edge, and a lower cutter blade member which comprises a central flat portion and integrally formed oppositely positioned cutter blades extending radially downwardly from the central portion at different angles, the upper surfaces of said lower blades being convex and the lower surfaces concave, each blade being beveled on its lower concave surface adjacent its leading edge, said beveled surface intersecting the upper convex surface of the blade and forming a sharp straight cutting edge, the blades of both the upper and lower cutter members being longitudinally straight edged, gradually diminishing in width from said central portion to the free ends of the blades and curved transversely throughout their length, the outer ends of the blades being cut on lines at right angles to the longitudinal cutting edge and said cutting edge being slightly longer than the non-cutting edge, said blades being mounted on the shaft to rotate therewith and conforming to the surface of a frusto-conical section whose axis is coincident with the axis of rotation of said blades.

10. The agitator and cutter unit for disintegrating food mixers defined by claim 9, in which the blades of the upper cutter blade member are inclined upwardly at approximately 25 and 35 degrees, respectively, relatively to the horizontal plane of the central portion of the said member, and the blades of the lower cutter blade member are inclined downwardly at approximately 47 and 55 degrees, respectively, relatively to the horizontal plane of the central portion of said member.

11. The agitator and cutter unit for disintegrating food mixers defined by claim 9, in which the rotatable shaft is provided with threads on its lower end and with an annular shoulder and reduced upper end, and in which the central flat portion of one of the two cutter blade members has an elongated slot extending in the direction of its radially extending blades, and the central flat portion of the other of the two cutter blade members has an elongated slot extending at right angles to the direction of its radially extending blades, the reduced end of the shaft extending through said slotted portions of the cutter members.

No references cited.